United States Patent
Ho et al.

(10) Patent No.: US 6,726,560 B2
(45) Date of Patent: Apr. 27, 2004

(54) DUAL POWER PATH DRIVE FOR A ROTATING THRESHING ROTOR OF AN AGRICULTURAL COMBINE AND METHOD FOR RE-ENGAGING THE SAME

(75) Inventors: Yun Ren Ho, Naperville, IL (US); Kevin D. McKee, Naperville, IL (US); John Bundy, Racine, WI (US)

(73) Assignee: CNH America LLC, Racine, WI (US)

( * ) Notice: Subject to any disclaimer, the term of this patent is extended or adjusted under 35 U.S.C. 154(b) by 12 days.

(21) Appl. No.: 10/199,863

(22) Filed: Jul. 19, 2002

(65) Prior Publication Data

US 2004/0018864 A1 Jan. 29, 2004

(51) Int. Cl.[7] .............................................. F26B 25/22
(52) U.S. Cl. ............................. 460/59; 56/11.7; 56/11.1
(58) Field of Search ............................. 460/6, 59, 119, 460/149; 56/10.3, 10.2 R, 10.6, 10.8, 11.3, 11.4, 11.5, 11.7, 11.1; 475/1, 257, 269, 303, 329

(56) References Cited

U.S. PATENT DOCUMENTS

| | | | |
|---|---|---|---|
| 3,180,080 A | 4/1965 | Budzich et al. ................ 60/19 |
| 4,898,049 A | 2/1990 | Niikura ........................ 74/866 |
| 5,193,416 A | 3/1993 | Kanayama ................. 74/733.1 |
| 5,251,132 A | 10/1993 | Bulgrien .................. 364/424.1 |
| 5,293,316 A | 3/1994 | Slicker ..................... 364/424.1 |
| 5,549,185 A | 8/1996 | Kale ........................ 192/12 C |
| 5,575,735 A | 11/1996 | Coutant et al. ................ 475/72 |
| 5,865,700 A | * 2/1999 | Horsch ........................ 475/72 |
| 6,056,657 A | 5/2000 | Garnett ........................ 472/72 |
| 6,247,295 B1 | * 6/2001 | Hansen et al. ............ 56/10.2 A |
| 6,663,525 B1 | * 12/2003 | McKee et al. ................ 475/72 |
| 6,666,007 B2 | * 12/2003 | Schroeder ................... 56/10.6 |

* cited by examiner

Primary Examiner—Thomas B. Will
Assistant Examiner—Meredith Petravick
(74) Attorney, Agent, or Firm—Rebecca Henkel; Brant T. Maurer

(57) ABSTRACT

A dual power path drive for rotatably driving a threshing rotor of an agricultural combine. The drive includes a planetary gear arrangement having an output connected to the rotor for rotation therewith, a rotatable input connected in rotatably driven relation to a rotatable output of a rotatable power source such as a fluid motor of a hydro-static drive controllably operable for variably rotating the output of the fluid motor, and the gear arrangement including an input connectable by engagement of a device such as an engine-to-ring clutch in rotatably driven relation to a rotatable output of an engine of the combine, the clutch including faces connected in rotatably driven relation to the engine and to the ring gear for rotation therewith, respectively. The drive is reengageable in driving relation to the rotor while the output of the engine and the rotor are rotating, by the steps of;

(a) operating the engine-to-ring clutch or other device or rotating the rotatable power source to bring the faces of the engine-to-ring clutch to about the same rotational speed; and then (b) fully engaging the clutch or device. If the initial rotor speed is within a much lower hydro-static speed range of the drive, a ring-to-frame clutch can be engaged in conjunction with the operation of the fluid motor for increasing the rotor speed from the hydro-static range to a range wherein the engine-to-ring clutch or other device can be slipped.

13 Claims, 7 Drawing Sheets

DUAL POWER PATH DRIVE FOR A ROTATING THRESHING ROTOR OF AN AGRICULTURAL COMBINE AND METHOD FOR RE-ENGAGING THE SAME

TECHNICAL FIELD

This invention relates generally to a dual power path drive for a rotatable threshing rotor or rotors of an agricultural combine, and more particularly, to a dual path drive such as a hydro-mechanical drive, operable for smoothly re-engaging with the rotor or rotors after disengagement therefrom, without having to wait for the rotation of the rotor or rotors to cease, and without occurrence of undesirable wear and shock to elements of the drive.

BACKGROUND ART

Currently, it is sought to use a dual path drive for rotatably driving rotatable elements of an agricultural combine, particularly a rotatable rotor or rotors of a threshing mechanism of the combine. Such rotors are typically relatively heavy members and are rotated at relatively high speeds, such that in the event that the drive is disengaged therefrom, for instance, as a result of being intentionally controllably disengaged by an operator, or automatically disengaged, such as when a sensor indicates that the operator has left the operator seat, it is typical practice to maintain the drive in a disengaged state to allow the rotor to rotate freely and decelerate until the rotational energy is dissipated and the rotation comes to a halt. This can take a relatively long time, depending on damping and inertia acting on the rotating elements. When the rotation has come to a halt, the drive is typically then reengaged with the rotatable element to bring them back to the desired rotating condition.

By use of a dual path drive, that is, a drive such as a hydro-mechanical drive having an input which receives power from a fluid power source such as a fluid motor and another input which receives power from a mechanical power source such as a gear box connected to an engine, or an electro-mechanical drive, which differs from a hydro-mechanical drive in that an electrical motor is used instead of a fluid motor, it is sought to provide the operating capability to re-engage the drive with the rotor as it is already rotating, such that time delays while waiting for the rotor or rotors stop rotating are reduced or substantially eliminated, without causing undesirable wear of elements and components of the drive, particularly, clutches thereof, and shock.

SUMMARY OF THE INVENTION

According to the present invention, a dual power path drive operable for rotatably driving a threshing rotor of an agricultural combine, and operable for re-engaging the drive with the rotor when already rotating, without causing undesirable time delays, wear and shock, is disclosed. The drive includes a planetary gear arrangement having an output connected to the rotor for rotation therewith, a rotatable input connected in rotatably driven relation to a rotatable output of a first power source or path which is preferably a fluid power source such as a fluid motor of a hydro-static drive conventionally controllably operable for variably rotating the output of the fluid motor, or a conventionally controllably variable speed electrical motor. The gear arrangement includes a second input, which is preferably the ring gear thereof, connectable by engagement or operation of a suitable device such as an engine-to-ring clutch, in rotatably driven relation to a rotatable output of a second power source or path connected to an engine of the combine. The device or clutch preferably includes faces or other elements connected in rotatably driven relation to the engine and to the ring gear or other input for rotation therewith, respectively, which faces or other elements can be commanded to slip one relative to the other, that is, brought into relation one to the other such that rotation of one can cause rotation of the other at some proportional speed to the one, or commanded to fully engage such that one will rotate the other at substantially the same speed. The method of the invention for engaging the drive in driving relation to the rotor while the output of the engine and the rotor are rotating, includes the steps of;

(a) commanding or operating the device or clutch to slip the faces or elements thereof or rotating the rotatable output of the first power source to bring the faces or elements to substantially matching rotational speeds; and then (b) commanding or operating the device or clutch to fully engage.

Prior to and during steps (a) and (b) the first power source can be operated as required for bringing the elements of the planetary gear arrangement to speeds at which the device or clutch can be slipped, and for bringing the rotor speed up or down to or maintaining it at a speed within a range which allows slipping the device or clutch without undesirable effects, particularly shock and/or wear. And, if the initial rotor speed at which it is desired to re-engage the drive is within a sufficiently lower speed range, an additional engageable device or clutch such as a ring-to-frame clutch can be engaged in conjunction with the operation of the first power source for increasing the rotor speed and the speed of the elements of the gear arrangement to range wherein the first device or clutch can be slipped without the undesired effects.

DETAILED DESCRIPTION OF THE INVENTION

Figure 1:
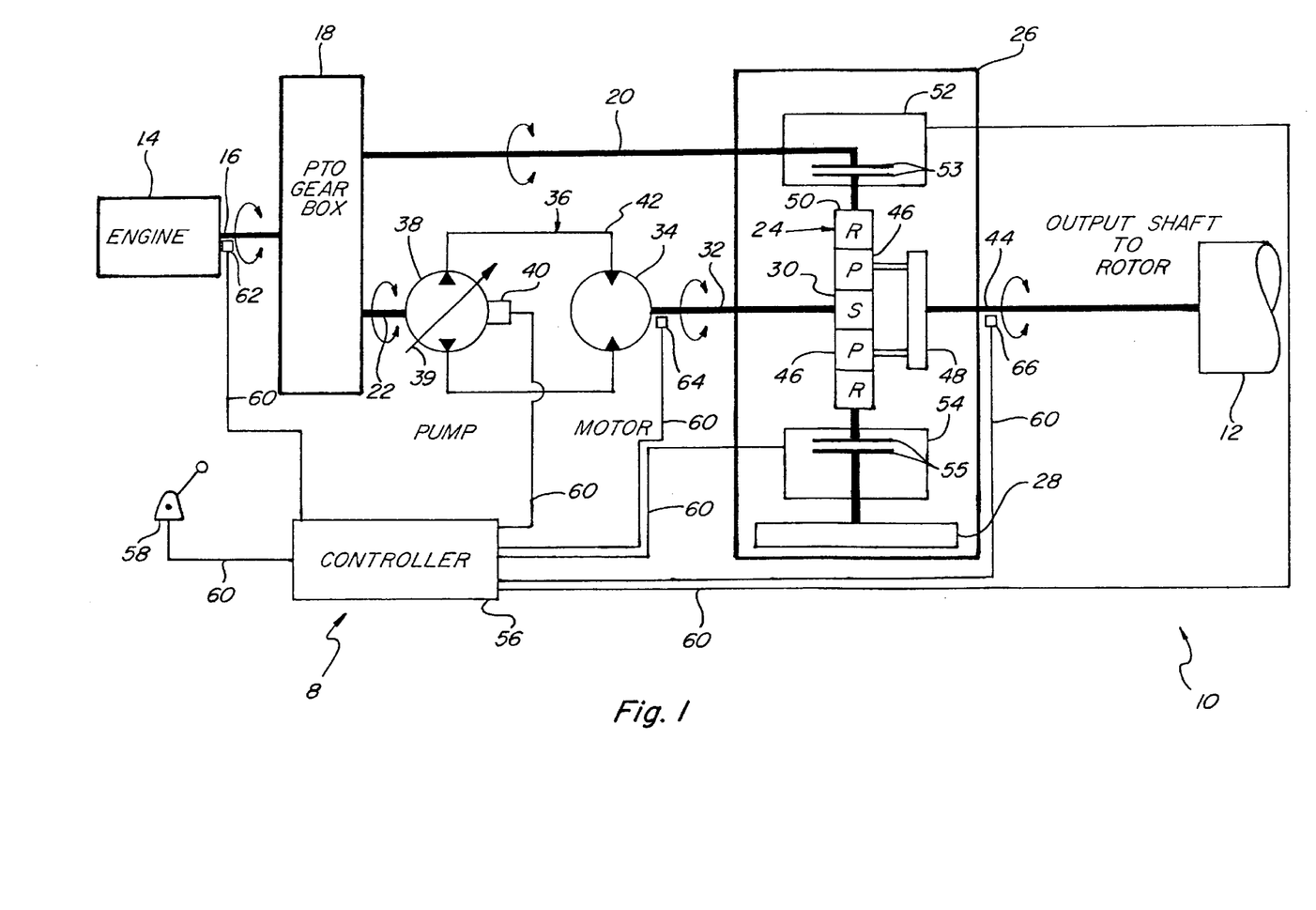
FIG. 1 is a simplified schematic representation of a dual path drive, which is a preferred hydro-mechanical drive, for a rotor or rotors of an agricultural combine, constructed and operable according to the present invention for re-engaging the rotor or rotors thereof when rotating.

Referring now to the drawings, in FIG. 1, a schematic representation of a preferred dual path drive 8 for an agricultural combine 10, drive 8 being constructed and operable according to the present invention for re-engaging with a rotating rotor or rotors 12 of a threshing mechanism of the combine, is shown. Combine 10 includes an engine 14 rotatably drivingly connected by an output 16 to a PTO gear box 18 for transmitting power to drive 8. Gear box 18 includes rotatable outputs 20 and 22 for connection to elements of drive 8.

The preferred drive 8 is a hydro-mechanical drive which includes a planetary gear arrangement 24 conventionally supported and contained in a gear box 26 which contains and fixedly supports or is connected to a fixed frame 28. Gear arrangement 24 includes a first rotatable input 30 which is preferably a sun gear thereof, denoted at S, connected to a rotatable output 32 of a first power path or source which is preferably a fluid motor 34 of a hydro-static drive 36. Hydro-static drive 36 also includes a variable displacement fluid pump 38 connected in rotatably driven relation to output 22 of gear box 18, and including an internal swash plate 39 controllable moveable by a control 40 to at least one positive position (+ in FIG. 3) displaced from a zero position such that when output 22 is rotated, pressurized fluid will be pumped by pump 38 along a fluid path 42 through motor 34 for drivingly rotating output 32 thereof in a first direction in the conventional well known manner. Swash plate 39 of pump 38 is also displaceable in an opposite or negative direction (−), for rotating output 32 of motor 34 in the opposite direction. Such displacement of pump 38 will also be referred to as pump swash. Arrangement 24 includes a rotatable output 44 preferably including a plurality of planet gears 46, denoted at P, enmeshed with sun gear S of input 30, planet gears 46 being mounted for rotation on a carrier 48. Gear arrangement 24 includes a second rotatable input 50 which preferably includes ring gear R which extends around and is enmeshed with planet gears 46. Second rotatable input 50 is rotatably connectable to output 20 of gear box 18, by operation or engagement of a suitable engageable device such as a conventional engine-to-ring clutch 52 including engageable faces 53 connected to output 20 and to ring R for rotation therewith, respectively, or another comparable slippable, selectably engageable device. Second rotatable input 50 is also connectable to fixed frame 28, by operation or engagement of a suitable device such as a conventional ring-to-frame clutch 54 including engageable faces 55 connected to ring R for rotation therewith and to frame 28, respectively. Under normal operating conditions, clutches 52 and 54 are operable or engageable for controlling rotation of second input 50 as first input 30 is rotated at a constant or variable speed as controlled by the swash of fluid pump 38, for controllably rotating output 44, and thus rotor or rotors 12, for performing a desired threshing function. Here, it should be noted that an additional multiple ratio gear box (not shown) can optionally be connected between output 44 and rotor or rotors 12, to enable selecting a ratio of rotation of the rotor or rotors 12 to output 44, as desired.

Control or command of engagement and disengagement of clutches 52 and 54 and displacement of fluid pump 38, respectively, can be accomplished by any suitable controller or controllers as represented by a controller 56. Controller 56 can include one or more fluid valves and/or microprocessors, and is controllable by, or receives input commands from, an operator input, such as a control lever or handle, a switch, or the like, as represented by lever 58. In regard to clutches 52 and 54, controller 56 is operable for commanding each to operate in a slipping mode, that is, moving faces 53 or 55 thereof sufficiently close together as at least one of the faces is rotated, such that the rotated face 53 or 55 can effect a desired proportional rotation of the other face 53 or 55, such as a matching or near matching rotational speed, or a nonrotating or slower rotating face 53 or 55 can slow rotation of the other face 53 or 55, by viscous action of fluid disposed between the faces, or by pressure applied for bringing the faces together. Controller 56 is also operable for commanding each clutch 52 and 54 to fully engage, such that the faces 53 of clutch 52 are brought together such that a driven one of the faces will drivingly rotate the other at substantially the same speed, and such that a rotatable face 55 of clutch 54 can be brought together with the nonrotating face 55 to at least substantially stop or prevent rotation of the rotatable face 55. Controller 56 can be connected to control 40 of pump 38, clutches 52 and 54, and lever 58 in any suitable conventional manner, such as by one or more fluid control lines, conductive paths or the like, as represented by lines 60 as shown, for receiving input signals from lever 58, communicating control signals to control 40 and clutches 52 and 54, and for receiving feedback and other information therefrom, such as, but not limited to, swash position information, clutch coil current information, and the like, in the conventional, well known manner. Controller 56 is additionally connected to an engine speed sensor 62 by a conductive path represented by a line 60 for receiving information representative of a rotation speed of output 16; to a speed sensor 64 by a conductive path represented by a line 64 for receiving information representative of a rotational speed of output 32 of fluid motor 34; and to a speed sensor 66 by a conductive path represented by another line 60 for receiving information representative of a rotation speed of output 44 and rotor 12.

As noted above, from time to time, drive 8 will be disengaged from rotatably driving rotating output 44 and thus from rotor or rotors 12 connected thereto, either manually by the operator, or automatically, for instance, by operation of a safety device, such as an operator seat sensor or the like. Disengagement will typically entail disengagement of engine-to-ring clutch 52 and zeroing of the angle of swash plate 39 and thus the displacement or swash of fluid pump 38, thereby allowing output 44 and rotor or rotors 12 to freely rotate until rotational energy thereof is dissipated and rotor or rotors 12 come to a stop. If it is desired to reengage rotor or rotors 12 before rotation thereof has completely or largely stopped, the problem presented is that the rotatable elements of drive 8, particularly faces 53 of clutch 52, are not likely to be rotating at a speed corresponding to that at which they would be rotating were they connected in driving relation to rotating output 44 at the current speed, such that drive 8 would receive a shock, possibly severe depending on the speed difference, and/or the faces 53 of clutch 52 would be subject to undesirable wear conditions, during the reengagement. Accordingly, it is desirable to have a method of operation of drive 8 for re-engaging with a rotating rotor or rotors 12 in a manner so as to minimize shock and clutch wear.

According to the present method, several approaches are contemplated for re-engaging a dual power path drive such as hydro-mechanical drive 8, with an already rotating rotor or rotors, each approach employing different paths that are a function of the then current rotor speed. In a first approach of the invention, the device for connecting the second input of the planetary gear arrangement to the mechanical power path, here, engine-to-ring clutch 52, is immediately commanded to slip, so as to introduce torque into the planetary gear arrangement for accelerating the elements thereof, particularly ring R, such that the faces of the engine-to-ring clutch connected to the engine and to the planetary are brought to substantially the same or matching rotational speeds. The engine-to-ring clutch is then commanded to fully engage, and the speed of the other power path, namely, the fluid motor, can then be controlled to achieve a desired rotor speed by varying the pump swash plate angle or swash, positively (+) to increase rotor speed or negatively (−) to decrease speed. In a second approach, the engine-to-ring clutch is commanded to slip and the pump swash plate is stroked or displaced, at the same time, to bring the faces of the engine-to-ring clutch to matching rotational speeds, then the engine-to-ring clutch is commanded to fully engage, and the swash plate angle varied to achieve a desired rotor speed. In the third approach, the planetary is initially accelerated by the fluid motor. Then, the engine-to-ring clutch is commanded to slip to bring the faces thereof to the same or substantially the same speed, and then is commanded to fully engage. Pump swash is then varied to obtain the desired rotor speed. In each approach, because the faces of the engine-to-ring clutch are rotating at least about the same speed when the engine-to-ring clutch is fully engaged, undesirable shock and clutch wear are avoided or minimized.

Figure 2:
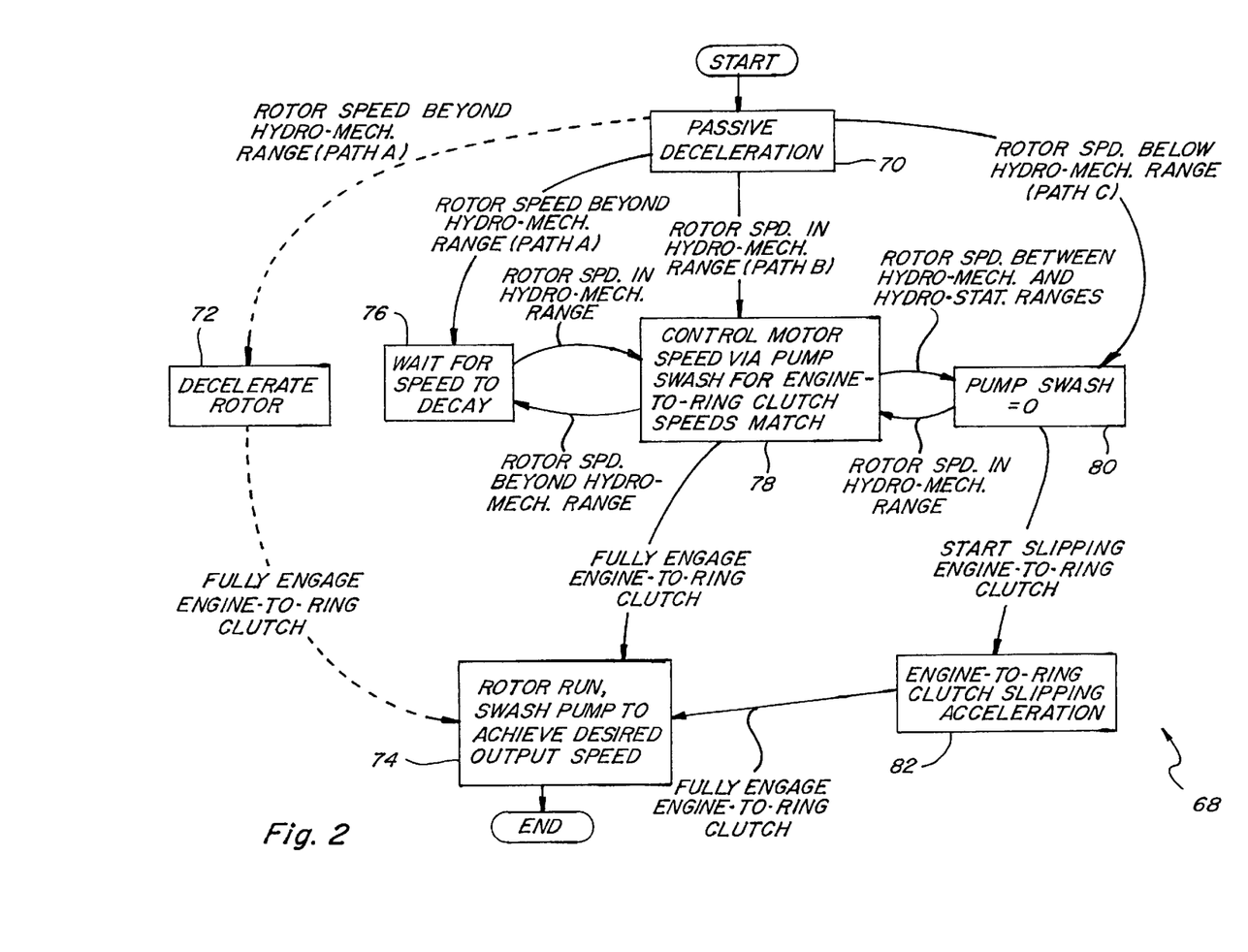
FIG. 2 is a simplified flow diagram showing steps of one approach of the method of the invention.

Referring also to FIG. 2, steps of a first approach 68 of the method of the invention for re-engaging the present drive 8 with rotor or rotors 12, are shown. At initiation or start, engine-to-ring clutch 52 and ring-to-frame clutch 54 are each in a disengaged state, and swash plate 39 of fluid pump 38 is at a zero displacement value, which are preferred characteristics of the disengagement of the rotor or rotors 12 for any of the above discussed reasons. In this state, rotor or rotors 12 and output 44 of gear arrangement 24 are allowed to passively decelerate, as denoted at block 70. At this time, the rotational speed of rotor or rotors 12, as sensed by sensor 66, will be determined by controller 56, which is also the first step in each of the other approaches. In this regard, the rotor speed will typically fall within one of the three following categories;

A) a speed greater than that which can be achieved with full engagement of engine-to-ring clutch 52 and the swash plate 39 of fluid pump 38 fully displaced, for the current engine operating speed (hereinafter also referred to as beyond the hydro-mechanical speed range);

B) a speed within the range achievable by full engagement of clutch 52 and full displacement of fluid pump 38 (hereinafter also referred to as in the hydro-mechanical speed range); or C) a speed below that achievable by full engagement of clutch 52 and displacement of pump 38 (hereinafter also referred to as below the hydro-mechanical speed range or within a clutch slipping range).

If it is determined by controller 56 that the speed of rotor or rotors 12 with drive 8 in a disengaged mode is beyond the speed range of drive 8, category A above, such as due to an engine speed drop, either of two paths can be employed, as denoted by dotted and solid line paths A, respectively. Here, it should be noted that in the disengaged state, clutches 52 and 54 are preferably both disengaged and the swash of pump 38 is zeroed. Following dotted line path A, as denoted at block 72, engine-to-ring clutch 52 can be commanded to slip to introduce drag on output 44 to thereby reduce the rotational speed of output 44 and rotor or rotors 12, hereinafter also referred to as rotor speed, such that a rotational speed of the face 53 of clutch 52 connected to ring R can be brought to a speed which matches or nearly matches that of the face 53 of clutch 52 connected to output 20. When this condition is present, controller 56 can command clutch 52 to fully engage faces 53 with minimal shock and/or wear. Pump 38 can then be swashed as required to drivingly rotate fluid motor 34 and output 32 to increase the rotor speed, or decrease rotor speed, as denoted as block 74. Here, it should be noted that controller 56 is able to and will determine the respective speeds of the faces 53 of clutch 52, because of the fixed ratio of gear box 18, the engine side of engine-to-ring clutch 52 will have a rotational speed proportional to that of output 16 of engine 14, as sensed by sensor 62, and the rotational speed of the ring side of clutch 52 can be determined by controller 56 as a function of the speed of output 44 as sensed by sensor 66, and the rotational speed of input 32 as sensed by sensor 64. In regard to the speed of output 44, it can be alternatively determined using a sensor (not shown) for sensing rotor speed, if desired, and information regarding any ratio of rotation of the rotor or rotors to the rotation of output 44, due, for instance, to the use of an optional multi-speed gear box between output 44 and the rotor or rotors.

As illustrated by solid path A, as an alternative to slipping clutch 52 to decelerate output 44 and rotor or rotors 12, controller 56 can wait for the rotational speed of rotor 12 and output 44 to decay, as denoted by block 76. As output 44 and rotor or rotors 22 are decelerating, the rotational speed of output 32 of fluid motor 34 can be finely controlled by controller 56 by varying the swash of pump 38 via control 40, such that the rotational speed of planet gears 46 can be changed as required to bring the speed of ring R and thus speed of face 53 of clutch 52 connected thereto, to a matching speed with that of face 53 of clutch 52 connected to output 20, as denoted by block 78. When the speed of the faces 53 of clutch 52 sufficiently match, clutch 52 can be fully engaged without significant shock or wear, and the speed of output 44 and rotor or rotors 12 increased or decreased as desired, as denoted at block 74.

If at the start of reengagement the rotational speed of rotor 12 and output 44 are within the hydro-mechanical speed range of drive 8 (path B) the swash can be immediately varied to achieve the speed match between the faces of clutch 52, as denoted at block 78, such that clutch 52 can be fully engaged without shock or undesirable wear, and then the pump swash subsequently varied to achieve a desired rotor speed, again, as denoted at block 74.

If it is determined by controller 56 that the rotor speed is below the hydro-mechanical speed range of drive 8 (path C), the swash of fluid pump 38 is maintained at zero, as denoted by block 80, while clutch 52 is slipped such that engine 14 will gradually accelerate rotation of gear arrangement 24 to bring the faces 53 of clutch 52 to the about the same speed, as denoted at block 82, and clutch 52 is fully engaged. Then, the swash of pump 38 can again be increased or decreased, as denoted at block 74, to increase or decrease the rotor speed as desired.

Figure 3:
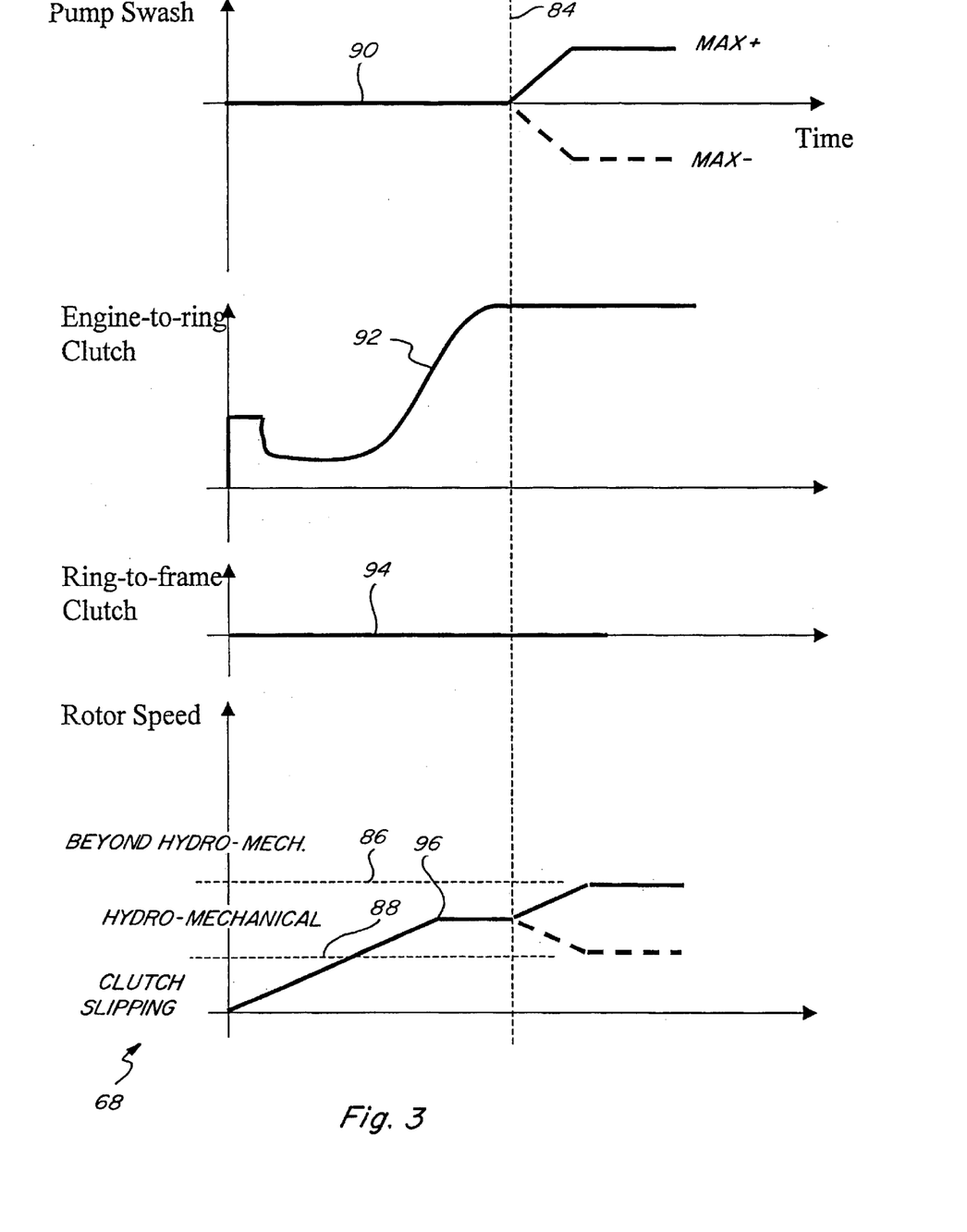
FIG. 3 is a diagrammatic representation showing operating time histories of various elements of the drive of FIG. 1 for the approach of FIG. 2.

FIG. 3 graphically illustrates the respective histories of the pump swash, engine-to-ring clutch current, and ring-to-frame clutch current commands, and also the rotor speed during the steps of path C of method 68 of FIG. 2, wherein the vertical dotted line 84 in the middle of the graphs denotes the time when the engine-to-ring clutch current is sufficient for full engagement, and horizontal lines 86 and 88 in the rotor speed graph denote thresholds between rotor speeds greater or beyond the hydro-mechanical speed range achievable by varying the pump swash with the engine-to-ring clutch fully engaged; speeds within that range; and speeds below that range or in the clutch slipping range, for the current engine operating speed. Examining the pump swash command graph, prior to full engagement, the pump swash command remains at zero displacement as denoted by line 90, which is the same as for disengagement of drive 8.

Examining the engine-to-ring clutch current graph, the current as denoted by line 92 is seen to gradually increase as it approaches line 84, which is representative of a command to slip that clutch. In the graph of the ring-to-frame clutch current, line 94, that current remains at zero which is represents the disengage command. As a result of the slipping of the engine-to-ring clutch, with the other parameters as shown, rotor speed is steadily increased from the clutch slipping range to about the middle of the hydro-mechanical speed range of the drive, as denoted by line 96. When the engine-to-ring clutch faces have been brought to sufficiently matching speeds, the engine-to-ring clutch is commanded to fully engage as denoted by the line 92 at line 84. Drive 8 is now re-engaged and the pump swash can be displaced further in the positive direction (solid line 90 to MAX +) to increase rotor speed (solid line 96 to the right of line 84), or negatively (dotted line 90 to MAX −) to decrease rotor speed (dotted line 96 to the right of line 84), as desired, or required to achieve a desired or commanded rotor speed.

Figure 4:
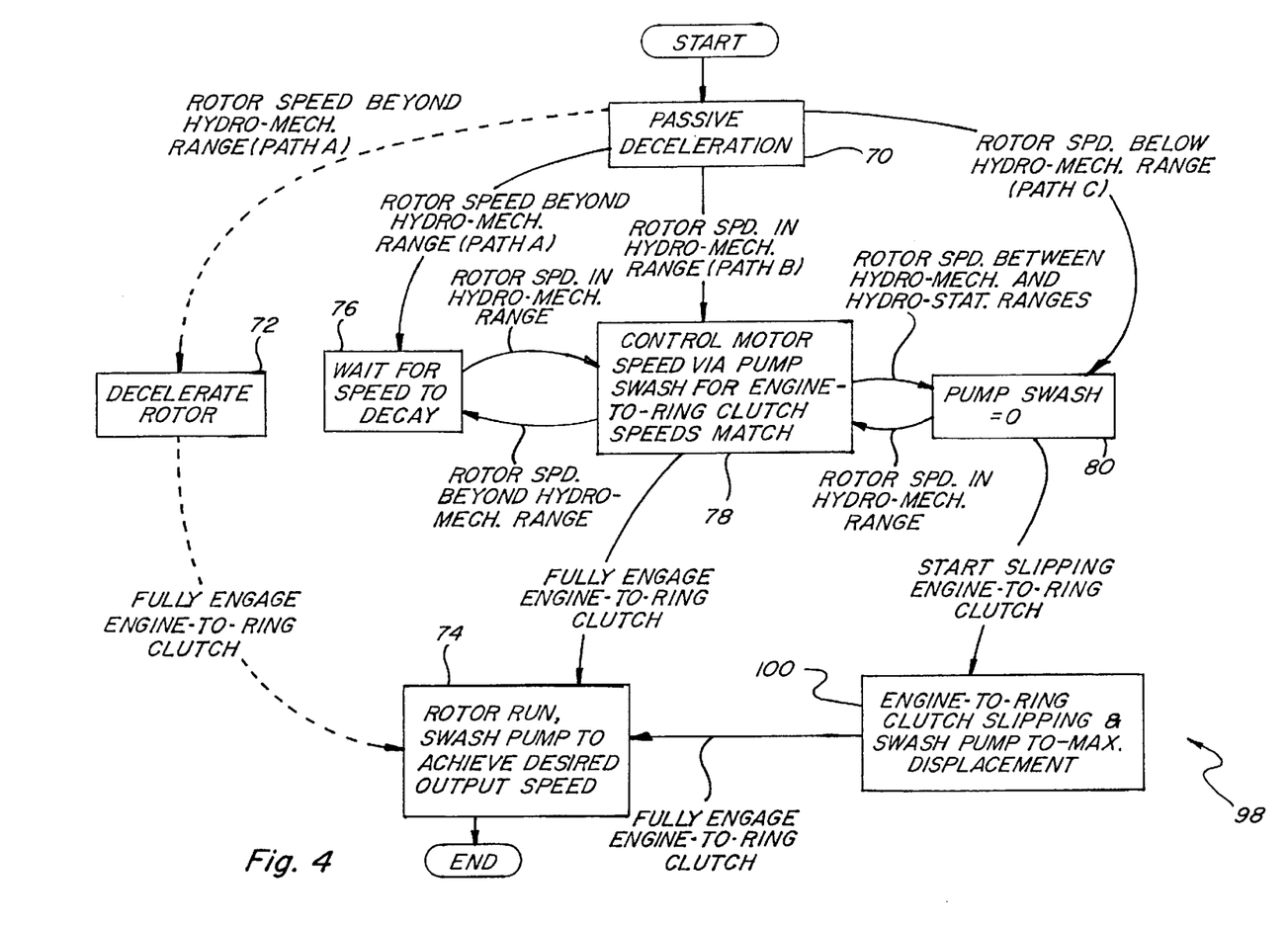
FIG. 4 is a simplified flow diagram showing steps of another approach of the method of the invention.

In FIG. 4, the second approach 98 according to the method of the invention for re-engaging drive 8 with rotating rotor or rotors 12 is illustrated. The steps of this approach when the rotor speed is above or within the hydro-mechanical range of drive 8 are the same as for the previously discussed method 68, as shown by blocks 70, 72, 74, 76, and 78 (paths A and B). The second approach differs when the rotor speed must be increased from below the hydro-mechanical speed range or in the clutch slipping range to the hydro-mechanical speed range. In this approach, clutch 52 is slipped and at the same time the swash of pump 38 is moved to its maximum negative (−) displacement, as denoted at block 100, to bring faces 53 of clutch 52 to matching speeds. Then, clutch 52 is fully engaged, and the pump swash can be varied between maximum (−) and maximum (+) swash to achieve the desired rotor speed (block 74) as in the prior approach.

Figure 5:
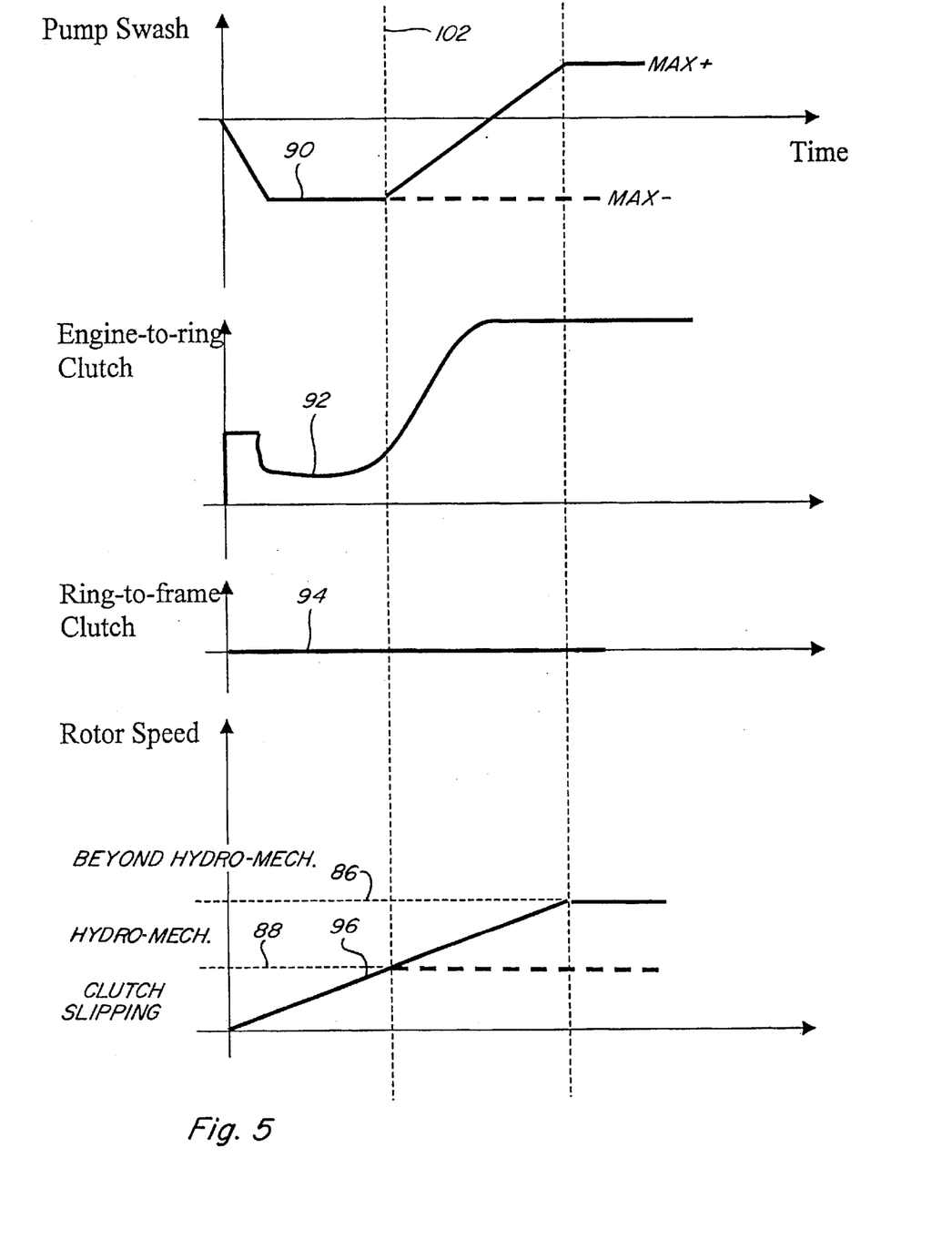
FIG. 5 is a diagrammatic representation showing operating time histories of elements of the drive of FIG. 1 for the approach of FIG. 4.

FIG. 5 respectively graphically illustrates the histories of the pump swash, engine-to-ring, and ring-to-frame clutch commands, and the rotor speed, for the second approach 98 when the initial rotor speed when reengagement is commenced is at or near the low end of the clutch slipping range. Here, pump swash denoted by line 90 is shown brought to the maximum negative (−) displacement as clutch 52 is slipped as shown by line 92, such that the rotor speed is brought from the clutch slipping range to or within the threshold of the hydro-mechanical range, as shown by the intersection of lines 88 and 102. The pump swash is then movable between maximum negative (−) swash or displacement and maximum positive (+) swash or displacement as clutch 52 is continued to be slipped, as required such that the clutch faces are brought to matching speeds, and clutch 52 is fully engaged. Rotor speed can then be varied as required by varying the pump swash (−) or (+) as before.

Figure 6:
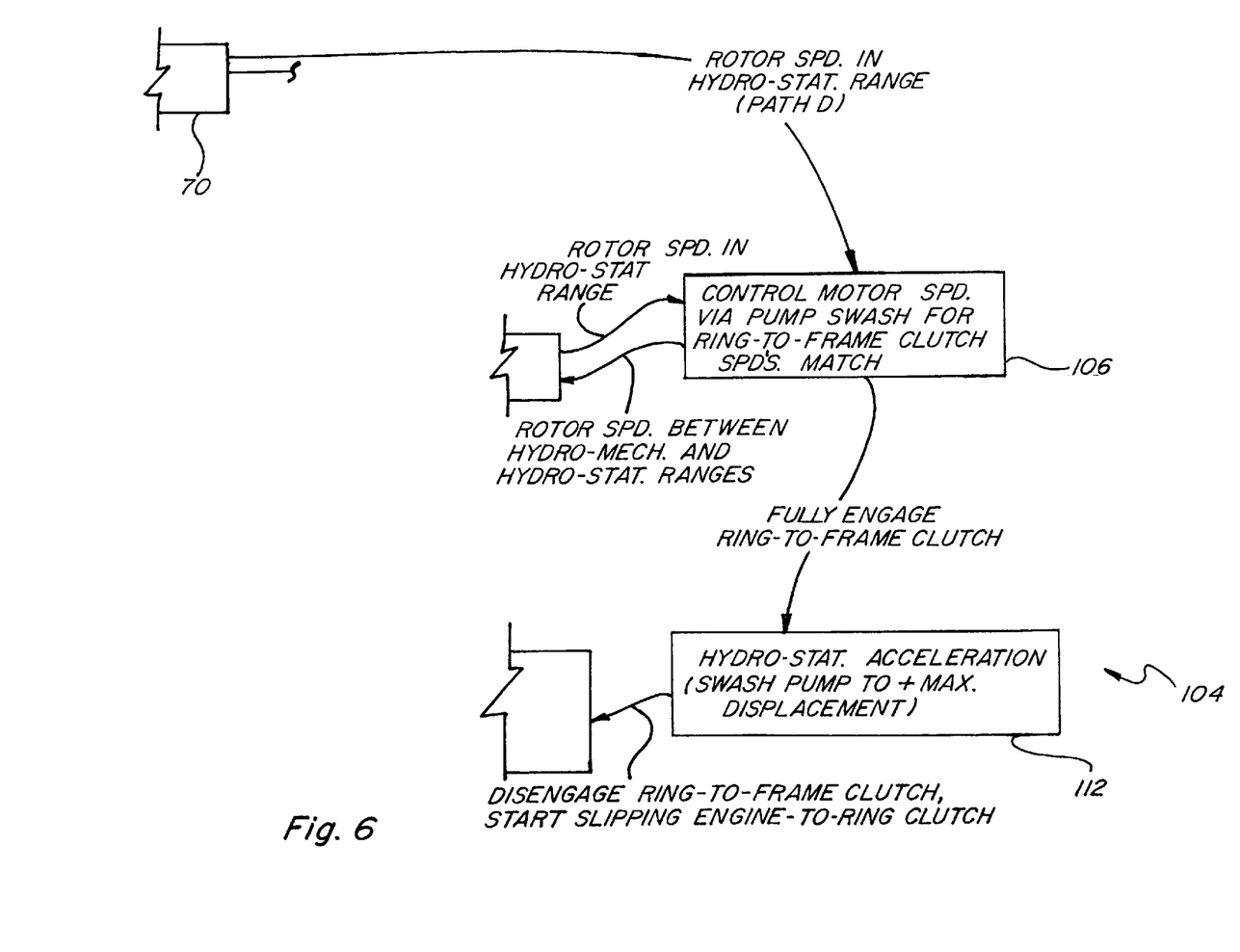
FIG. 6 is a simplified flow transition diagram showing steps of a third approach of the method of the invention.
Figure 7:
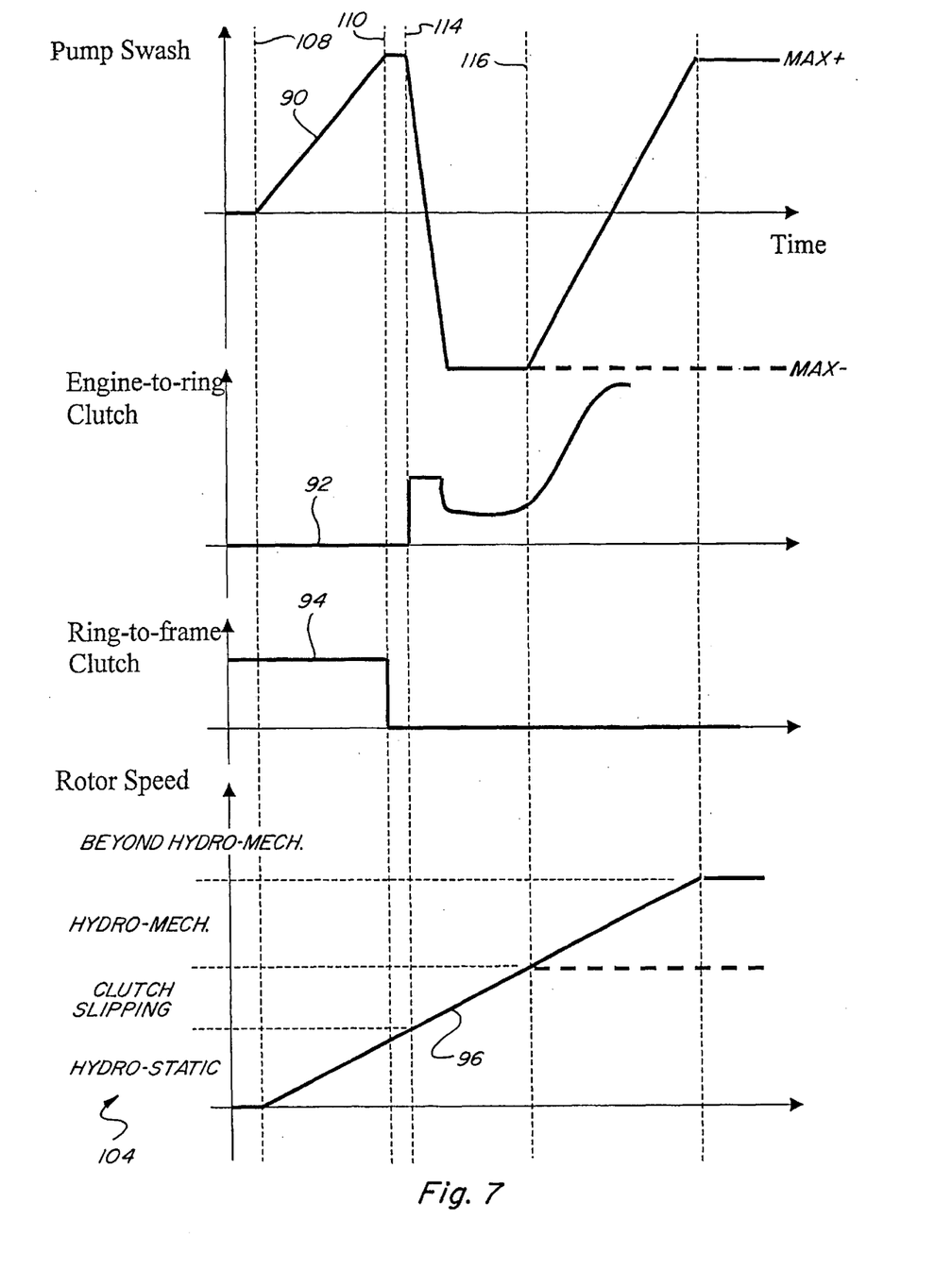
FIG. 7 is a diagrammatic representation showing operating time histories of elements of the drive of FIG. 1 for the approach of FIG. 6.

Referring to FIG. 6 as an extension of FIG. 4, and also to FIG. 7, steps of the third approach 104 of the present method are disclosed. This approach has utility when the rotor speed is within a hydro-static speed range D, which is an additional range to the three previously discussed, and is lower than the hydro-mechanical speed range and can be lower than the clutch slipping range, or can overlap or replace the clutch slipping range, if the hydro-static drive 36 has adequate capability. Essentially, in the hydro-static range, engagement of ring-to-frame clutch 54 and a positive displacement of pump 38 can be used to drive the rotor to bring the rotor speed up to the clutch slipping range, or to the hydro-mechanical range if hydro-static drive 36 has the capability. In approach 104 as illustrated in FIG. 6, with the initial rotor speed within the hydro-static speed range D, it is first desired to bring the rotational speed of ring R to zero, such that faces 55 of ring-to-frame clutch 54 can be fully engaged with minimal shock and wear. This can be achieved as shown by block 106, which extends from block 70, and wherein pump swash is used to slow the ring R speed to zero. Ring-to-frame clutch 54 is then fully engaged to prevent any significant rotation of ring R. Pump 38 can then be swashed positively, as required to drivingly increase rotor speed to the clutch slipping range, or to the hydro-mechanical range, if so capable. The ring-to-frame clutch can then be disengaged and the engine-to-ring clutch slipped as shown at block 112, or if now in the hydro-mechanical range, the speeds of faces 53 of engine-to-ring clutch 52 matched as before to allow full engagement thereof. FIG. 7 is a graphical representation of the histories of the pump swash, engine-to-ring clutch, and ring-to-frame clutch commands, and rotor speed for commencement of reengagement of drive 8 when the rotor is rotating at a speed in the lower hydro-static range. At commencement, pump swash is again zero as shown by line 90, the engine-to-ring clutch current is zero as shown by line 92, and the ring-to-frame clutch current is sufficient to engage that clutch as shown by line 94. Beginning at line 108, pump swash is then increased to MAX +, with the ring-to-frame clutch engaged, to gradually increase rotor speed. When the pump swash is at Max +, line 110, the ring-to-frame clutch is commanded to disengage, and the engine-to-ring clutch is commanded to slip, such that the rotor speed continues to approach the clutch slipping range, commencing at line 114. At this time, rapid movement of pump swash to MAX − displacement is commanded, while the engine-to-ring clutch is slipped, until the hydro-mechanical speed range is reached. Pump swash can now be adjusted as required to achieve matching of speeds of faces 53 of the engine-to-ring clutch and that clutch commanded to fully engage. Pump swash can now be adjusted as required to achieve the commanded or selected rotor speed within the hydro-mechanical range.

Here, it should be noted that the degree of pump swash utilized when accelerating the rotor from the hydro-static speed range may vary, depending on where in that range the speed is. For instance, as a non-limiting example, greater positive pump displacements may be used for greater initial rotor speeds.

Here also, as alternative drive constructions and configurations, it should be noted that the first and second inputs and the output of the planetary gear arrangement can be switched, such as, for instance, such that the first input includes the carrier and the output can include the sun gear, as desired or preferred for a particular application. Alternative power sources can also be used. For instance, instead of a hydro-static power source, the drive could use a variable speed electric motor, if desired or required for a particular application. It should be additionally noted that the steps of any of the above discussed approaches can be timed as desired in cooperation with other actions, such as engagement of feeders, headers, beater-choppers, and spreaders, as required, it typically being generally desirable to engage at least the beater-chopper prior to reengagement of the rotor.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of operation of a dual path drive for rotatably driving a threshing rotor of an agricultural combine, comprising the steps of:

(a) providing a planetary gear arrangement having an output connected to the rotor for rotation therewith, a first rotatable input connected in rotatably driven relation to a rotatable output of a variable speed rotatable power source controllably operable for variably rotating the output thereof, and the gear arrangement including a second input connectable by engagement or operation of a device in rotatably driven relation to a rotatable output of an engine of the combine, the device including faces connected in rotatably driven relation to the engine and to the second input for rotation therewith, respectively;

(b) while the rotor is rotating and the second input is disengaged from the engine, commanding or operating the device to slip the faces thereof to bring the faces to substantially matching rotational speeds; and then (c) commanding or operating the device to fully engage for re-engaging the second input to the engine.

2. The method of claim 1, further comprising during step (c) the step of controllably operating the rotatable power source for variably rotating the output thereof, for controllably rotating the output of the gear arrangement and the rotor at a desired rotational speed.

3. The method of claim 1, further comprising in step (b) the step of controllably operating the rotatable power source for bringing the faces of the device to about the same rotational speed.

4. The method of claim 1, comprising a step prior to step (b), of controllably operating the rotatable power source to change a rotational speed of the rotor.

5. The method of claim 4, the step prior to step (b) comprising controllably operating the rotatable power source for reducing the rotational speed of the rotor.

6. The method of claim 4, wherein the step prior to step (b) comprises controllably operating the rotatable power source for increasing the rotational speed of the rotor.

7. The method of claim 1, the drive further including a second device engageable or operable for connecting the second input to a fixed frame of the drive, and the method further including prior to step (b), the step of engaging the second device for stopping rotation of the second input while increasing a rotational speed of the rotatable power source.

8. The method of claim 7, wherein the rotatable power source is rotated to bring the speed of the second input to zero prior to connection thereof to the fixed frame.

9. The method of claim 1, comprising in step (b) prior to commanding or operating the device to slip the faces thereof, of controllably operating the rotatable power source to change a rotational speed of the ring gear.

10. The method of claim 9, where in step (b) the rotatable power source is operated for reducing the rotational speed of the ring gear.

11. The method of claim 9, where in step (b) the rotatable power source is operated for increasing the rotational speed of the ring gear.

12. A dual path drive for rotatably driving a threshing rotor of an agricultural combine, comprising:

a planetary gear arrangement having an output connected to the rotor for rotation therewith, a first rotatable input connected in rotatably driven relation to a rotatable output of a variable speed rotatable power source controllably operable for variably rotating the output thereof, and the gear arrangement including a second input connectable by engagement or operation of a device in rotatably driven relation to a rotatable output of an engine of the combine, the device including faces connected in rotatably driven relation to the engine and to the second input for rotation therewith, respectively, the device being operable to slip the faces thereof to bring the faces to substantially matching rotational speeds while the rotor is rotating and the second input is disengaged from the engine, and then the device being operable to fully engage for re-engaging the second input to the engine.

13. A method of operation of a dual path drive for rotatably driving a threshing rotor of an agricultural combine, comprising the steps of:

(a) providing a planetary gear arrangement having an output connected to the rotor for rotation therewith, a first rotatable input connected in rotatably driven relation to a rotatable output of a variable speed rotatable power source controllably operable for variably rotating the output thereof, and the gear arrangement including a second input connectable by engagement or operation of a device in rotatably driven relation to a rotatable output of an engine of the combine, the device including faces connected in rotatably driven relation to the engine and to the second input for rotation therewith, respectively;

(b) while the rotor is rotating and the second input is disengaged from the engine, controllably rotating the rotatable output of the variable speed rotatable power source to bring the faces of the device to substantially matching rotational speeds; and then (c) commanding or operating the device to fully engage for re-engaging the second input to the engine.

* * * * *